United States Patent Office 3,344,074
Patented Sept. 26, 1967

3,344,074
RUBBER TREATMENT
Lee A. Bowers, 4620 Park Road,
Charlotte, N.C. 28209
No Drawing. Filed May 27, 1964, Ser. No. 370,728
5 Claims. (Cl. 252—72)

This invention relates to the treatment of rubber. More particularly, this invention relates to the treatment of rubber which has shrunk or become hardened to cause the same to expand and become pliable one again. The invention finds particular applicability in preventing and stopping leaks in closed fluid containing systems protected by rubber seals and packing, e.g., hydraulic systems including automatic motor vehicle transmissions when the leaks are caused by hardening and shrinkage of transmission seals, and in lubrication systems of internal combustion engines when the leaks are caused by hardening and shrinking of seals in the main bearings.

Hydraulic power transmission is an old and well established engineering discipline. Although hydraulic power is still something of a mystery to many practical engineers, it is at the same time becoming of ever-increasing importance and obtaining wider scope of application in machine operation. For example, in the automotive vehicle industry by far a major proportion of new vehicles are equipped with automatic transmisisons, power steering and power brakes, all of which are hydraulic systems.

Hydraulic fluids and the systems in which they are contained are subjected to extremes of pressure. The fluids consist of oils, principally mineral based, and a large source of potential trouble in hydraulic systems lies in the hydraulic fluid itself. The components most likely to suffer damage or deterioration, apart from the fluid, are the seals and packings employed to retain the fluid pressure within the system.

Hydraulic seals and packings are of vital importance from two aspects. First, the efficiency of a hydraulic system and, in fact, its ability to function at all depend upon retaining the fluid in the circuit. Pressure is a function of resistance to flow so that if some flow is possible due to leakage, full pressure cannot be developed in the circuit. Secondly, seals are the components of the hydraulic system requiring the most frequent replacement. Sealing problems are complicated by the fact that efficient sealing is required under varying conditions of pressure, both under static and moving conditions.

All seals may be classed according to their materials for their design is to a great extent dictated by these materials. Two general categories exist, namely, metallic and nonmetallic materials. Metallic seals are mainly limited to piston rings, although in a few cases they have been fitted to cylinder bores, and this trend continues.

Nonmetallic seals are mainly made of leather, rubber or synthetic rubber, either with or without some form of fabric bonded into them for additional strength and rigidity. Among nonmetallic materials the use of rubber and rubber-like materials in hydraulic seals is widespread. These are usually compounded from the base elastomer stock with appropriate fillers and plasticizers according to highly proprietary recipes. The base stock for most seals used may be natural rubber or one of the numerous synethetics such as isobutylene, silicone, butadiene and acrylonitrile. Carbon black and zinc oxide are commonly used fillers for rubber. The plasticizers give the mixture of base stock and filler the fluidity it needs to flow into the mold and fill all voids prior to and during the vulcanization or curing process. Vulcanizing agents such as sulfur combine with the rubber to form nontacky cured compounds. The plasticizer controls the weight and temperature at which vulcanizing takes place and, indirectly, the physical properties of the finished packing or seal.

The replacement of hydraulic seals is a comparatively costly and time-consuming procedure. Also, there are many potential hazards and great care must be exercised. For example, new seals are robust in standing up to their designed duty but are otherwise fragile and may be easily damaged in installation. In some the lips are thin and particularly liable to damage. Also, in removing and inserting seals it is necessary to use tools. These may easily cause damage to the adjacent metal parts, such damage being difficult to make good. Finally, it is easy to get dirt into the open systems and cause the replacement seals to wear too rapidly. It is seen that it is important to keep the seal in effective operating condition for as long as possible.

The internal combustion engine is a heat engine; that is, it operates by means of the expansive energy of a gaseous fuel which has been subjected to combustion within a working cylinder. A gas engine is composed of both stationary parts, including the cylinder and crankcase, and moving parts, e.g., the piston, connecting rod and shaft. A supply of fuel, proper ignition, cooling and lubrication are all necessary for operation of the engine. The lubrication system is important because of both the presence and speed of the moving parts and the high cylinder temperatures resulting from the combustion of fuel therein.

Selection of a proper engine lubricant is determined by the rubbing pressure, rubbing velocity and temperature encountered within the engine. A preferred lubricant is a hydrocarbon based mineral oil. Operability and efficiency of the engine depend to a large extent upon continued presence therein of sufficient lubricant, i.e., preventing loss thereof from the lubrication system. Components of the engine likely to develop leaks, include the main bearings, and particularly the rear main bearing. In most foreign made automobiles and in an increasing number of domestic automobiles, seals in the main bearings are made of rubber. As discussed above with regard to transmission seals, it is important that the main bearing seals remain in effective operating condition for extended periods of time.

It is therefore an object of this invention to provide a method and composition for maintaining rubber in an expanded and pliable condition.

It is another object of the present invention to provide a method and composition for causing rubber that has shrunk or become hardened to expand and to become soft and pliable once again.

It is still another object of the present invention to provide a method and composition for prolonging the life of rubber seals found in closed fluid containing systems, e.g., automotive automatic vehicle transmissions and lubricating systems for internal combustion engines.

It is a further object of the present invention to provide a method and composition for treating such rubber seals without the necessity of removing the seals from position in the transmission or lubricating system.

It has been found that the above objects may be attained by treating the rubber with trichloroethylene. While the trichloroethylene may be applied directly to rubber if desired, it is more economical to use a composition containing trichloroethylene as an essential ingredient. For example, it may be used in the form of a solution, e.g., in a hydrocarbon solvent, which may also include a detergent and coloring matter, if desired.

When the rubber to be treated is located in a hydraulic system, e.g., an automatic vehicle transmission, the trichloroethylene may be added directly to the hydraulic fluid therein. However, thorough mixing and uniform results are obtained more rapidly when the trichloroethylene is diluted with a hydrocarbon based oil, e.g., transmission fluid or 10 weight oil, and the mixture added to the hydraulic fluid in the transmission.

One preferred mixture contains a major amount of hydrocarbon based oil and a minor amount of trichloroethylene. The mixture may contain small amounts of detergent, usually oil-soluble, and/or coloring matter as desired. Generally, the mixture may contain from 55 to 90% by weight oil, e.g., transmission fluid or 10 weight oil, from 45 to 10% by weight trichloroethylene, from 0 to 4%, e.g., 2% by weight detergent and from 0 to 2%, e.g., 1% by weight coloring material.

Mixtures within the above ranges are effective when added to the fluid in a hydraulic system in an amount, for example, of from one to two pints. The optimum amount to be added will depend on the trichloroethylene concentration, the volume of fluid in the transmission and the condition of the rubber to be treated. For example, automatic motor vehicle transmissions usually contain from 6 to 12 quarts, i.e., from 12 to 24 pints of fluid therein. Furthermore, less trichloroethylene is necessary to prevent leaks in a system having rubber in good condition therein than will be needed if the rubber in the system has shrunk or become hardened.

From the above considerations, it will be seen that the trichloroethylene is operative when added to the fluid in a hydraulic system in amounts of from 0.5%, preferably from 2% to 10% by weight or higher, based on the weight of the hydraulic fluid. When the trichloroethylene is diluted with a major proportion of hydrocarbon based oil, the mixture may be added to the hydraulic fluid in amounts of from 1% to 20% by weight or higher.

The compositions and method of the present invention are useful with all types of rubber and when referring to rubber in the above description and in the claims, it is intended to refer both to natural rubber and to synthetic rubber, including butyl rubber and neoprene, as well as to all other types of synthetic rubber.

In the following examples and throughout the specification and claims all parts are parts by weight unless otherwise indicated.

*Example 1*

A preferred formulation according to the present invention was prepared and had the following composition:

| | Pounds |
|---|---|
| Trichloroethylene | 13 |
| Detergent | 4 |
| Red color | 1 |
| Transmission fluid | 82 |
| Total | [1] 100 |

[1] 12½ gallons.

The above ingredients were mixed thoroughly. Two pints of the formulation were added to the hydraulic fluid in an automatic motor vehicle transmission which had developed leaks at the rubber transmission seals in the converter. After a period of 12 hours, the leaks were eliminated.

*Example 2*

Another preferred formulation according to the present invention was prepared having the following composition:

| | Pounds |
|---|---|
| Trichloroethylene | 24 |
| Detergent | 4 |
| Red color | 1 |
| Transmission fluid | 71 |
| Total | 100 |

The procedure of Example 1 was repeated. One pint of the formulation was added to the hydraulic fluid in a leaky automatic vehicle transmission with results comparable to those in Example 1.

*Example 3*

A mixture was prepared of the following ingredients:

| | Pounds |
|---|---|
| Trichloroethylene | 30 |
| 10 weight oil | 70 |
| Total | 100 |

A piece of hardened natural rubber 0.0255" thick was placed in a bath of the above mixture and allowed to stand for 24 hours after which the rubber had swelled to a thickness of 0.0785".

*Example 4*

A mixture was prepared of the following ingredients:

| | Pounds |
|---|---|
| Trichloroethylene | 25 |
| Transmission fluid | 75 |
| Total | 100 |

The procedure of Example 3 was repeated with a piece of hardened butyl rubber. The measurements were 0.0255" before treatment and 0.0751" thereafter.

When the rubber to be treated is located in a lubrication system, e.g., in an internal combustion engine, the trichloroethylene may be added directly to the lubricant. As with the hydraulic systems discussed above, the trichloroethylene is operative in lubrication systems in amounts of from 0.5%, preferably from 2%, to 10% by weight or higher, based on the weight of the lubricant. The trichloroethylene may, if desired, be diluted with lubricant prior to addition to the system. Trichloroethylene so added has successfully eliminated leaks which had developed at the rubber seals in the main bearings of an engine.

What is claimed is:

1. A method of stopping leaks in a closed hydraulic fluid containing system having a rubber seal therein by causing said rubber seal to expand, said method comprising adding trichloroethylene to said fluid in said system in an amount of about 0.5 to 20% by weight, based on the weight of said fluid, whereby said rubber seal is contacted by said trichloroethylene.

2. A method according to claim 1 wherein the trichloroethylene is added in an amount of from 2 to 10% by weight of said fluid.

3. A method according to claim 1 wherein the trichloroethylene is added in the form of a solution in a hydrocarbon solvent.

4. A method according to claim 3 wherein the fluid containing system is an automatic motor vehicle transmission and the hydrocarbon solvent is a hydrocarbon based oil.

5. A method according to claim 3 wherein the fluid containing system is a lubrication system in an internal combustion engine and the hydrocarbon solvent is a hydrocarbon based oil.

References Cited

UNITED STATES PATENTS

| 1,056,575 | 3/1913 | Olin | 252—72 |
| 2,019,339 | 10/1935 | Clark | 252—1 |
| 2,528,348 | 10/1950 | Denison et al. | 252—75 |
| 2,814,595 | 11/1957 | Beerbower et al. | 252—54 |

LEON D. ROSDOL, *Primary Examiner.*

R. D. LOVERING, S. D. SCHWARTZ, *Examiners.*